United States Patent [19]

Ricci

[11] Patent Number: 4,939,964
[45] Date of Patent: Jul. 10, 1990

[54] LOW-CLEARANCE PIPE LATHE

[76] Inventor: Donato L. Ricci, Rte. 1, Box 1067, Hager City, Wis. 54014

[21] Appl. No.: 245,360

[22] Filed: Sep. 16, 1988

[51] Int. Cl.⁵ .......................... B23D 21/04; B23B 5/08
[52] U.S. Cl. ............................................ 82/113; 30/97
[58] Field of Search ................. 82/4 R, 4 C, 113, 128; 30/96, 97

[56] References Cited

U.S. PATENT DOCUMENTS

| | | | |
|---|---|---|---|
| 2,747,274 | 5/1956 | Willard et al. | 30/97 |
| 2,796,792 | 6/1957 | Dias | 30/97 |
| 3,431,646 | 3/1969 | Young | 30/97 |
| 3,942,248 | 3/1976 | Sherer et al. | 30/97 |
| 4,397,202 | 8/1983 | Mayfield et al. | 82/4 C |
| 4,418,591 | 12/1983 | Astle | 82/4 C |
| 4,665,782 | 5/1987 | Vander Pol | 82/4 C |
| 4,739,685 | 4/1988 | Ricci | 82/4 C |
| 4,770,074 | 9/1988 | Kwech | 82/4 C |

*Primary Examiner*—William Terrell
*Attorney, Agent, or Firm*—Haugen and Nikolai

[57] ABSTRACT

Disclosed is a portable machining lathe (10) having a stationary member (11) interconnected with a gear housing (16) which covers a rotating gear member (15). A circular race member (25) is connected to the gear member (15) and held in place by means of a plurality of roller bearings (20). A tool module (35) having a tool bit (54) machines the work piece (38) and automatically advances longitudinally along the work piece (38) by means of an advance mechanism (72).

7 Claims, 5 Drawing Sheets

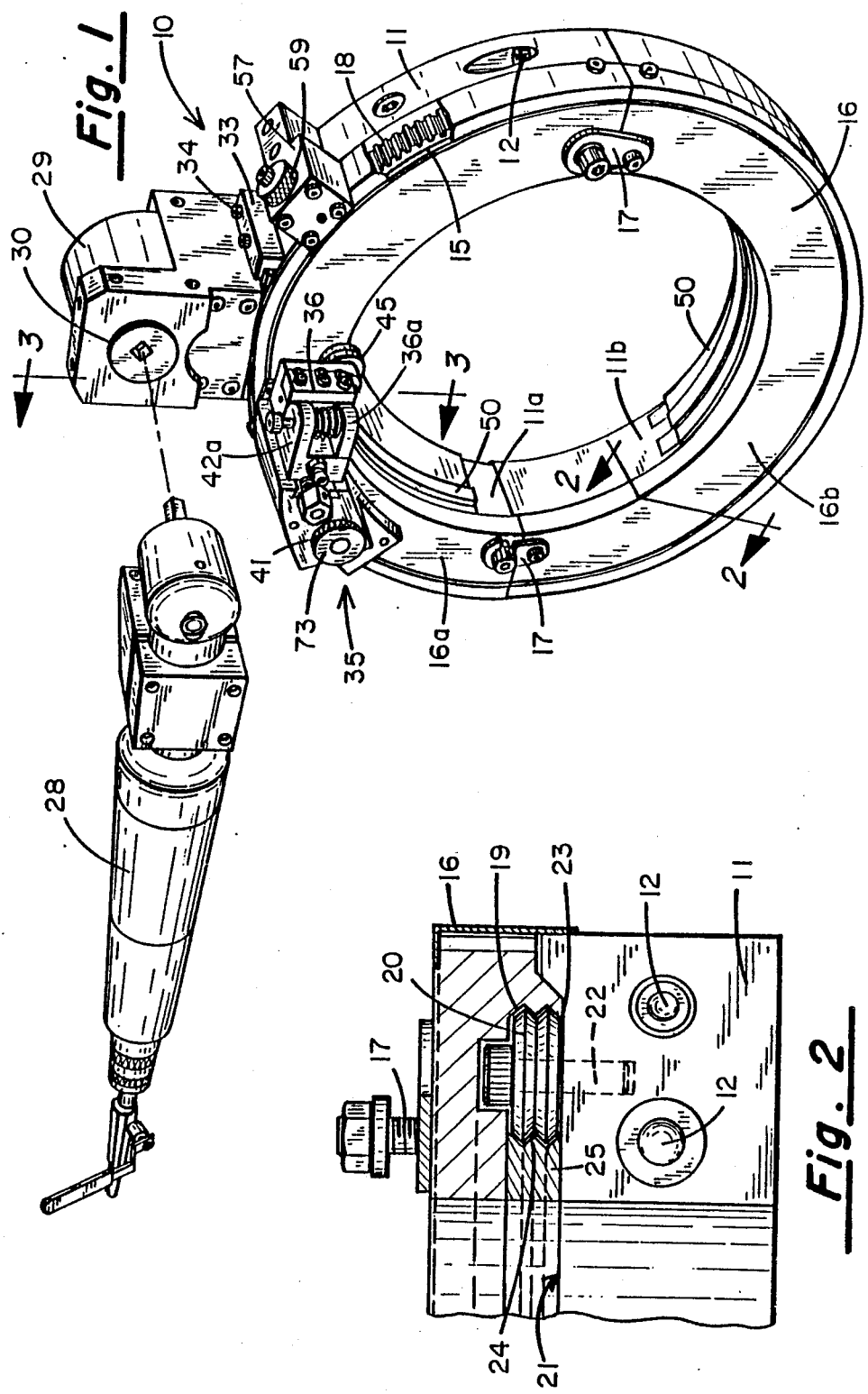

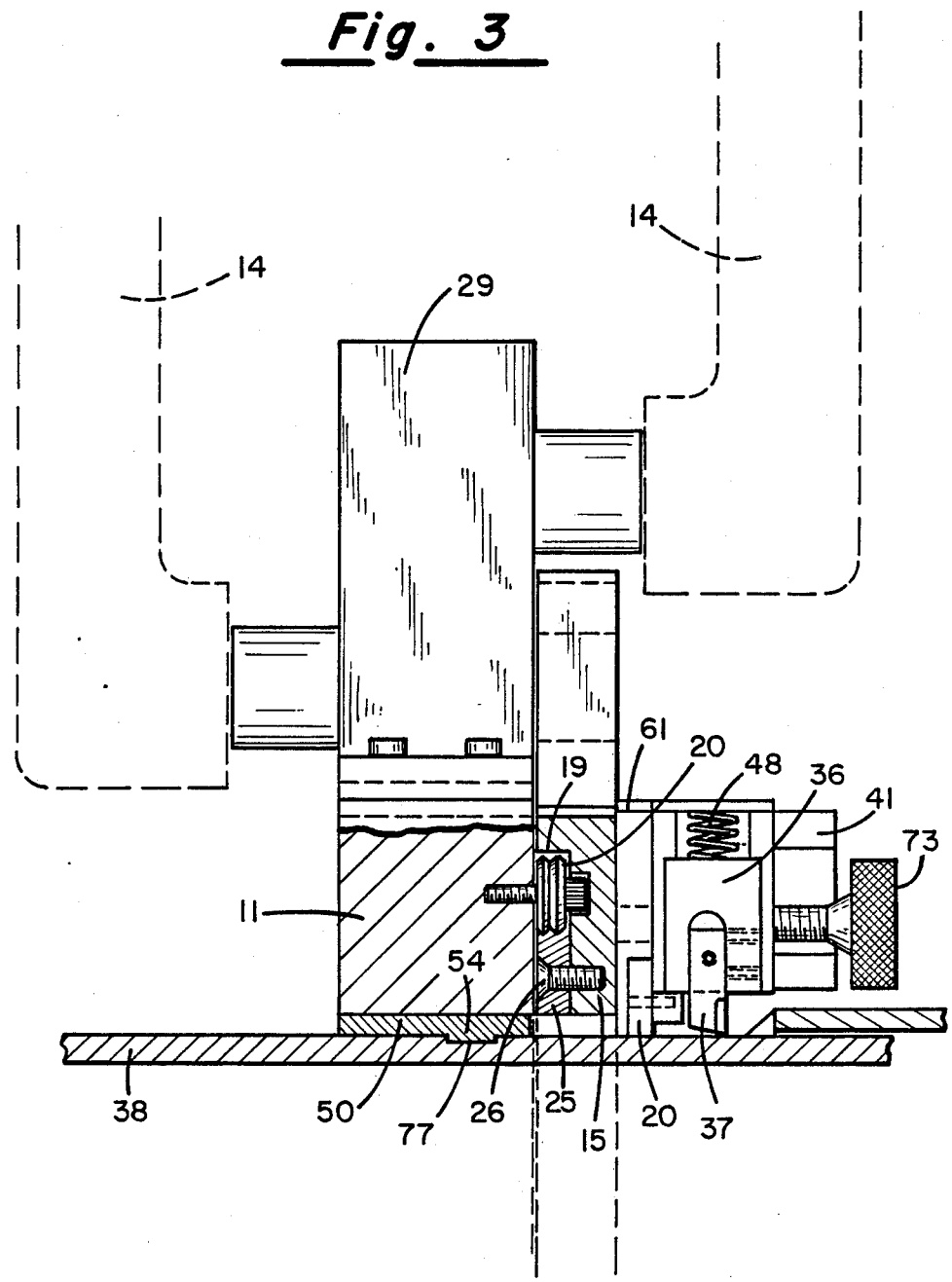

LOW-CLEARANCE PIPE LATHE

FIELD OF THE INVENTION

The present invention relates generally to machining lathes, and more particularly to a split frame, clamshell type of portable lathe for machining pipes and similar work pieces.

BACKGROUND OF THE INVENTION

The necessity of providing a juncture on a pipe that is professionally finished with a defect-free weld has been appreciated for some time. In pipelines, nuclear reactors, and the like, the necessity of providing junctures that are reliable and durable is of the utmost importance. Frequently, the working conditions associated with the pipe machining equipment have been quite hostile either to the machine or to the machine operator. For example, in nuclear reactors, the necessity for pipe replacements has been such that these types of maintenance procedures are required quite frequently. However, maintenance personnel may only work in an area that is radioactively hot for extremely short periods of time. Accordingly, the desirability of an apparatus for finishing pipes which can be set up in a minimal amount of time, can proceed automatically, and can be initialized and dismantled in a minimal amount of time has obtained increasing importance and acceptance in the industry.

Several difficulties have been associated with the prior art devices. These difficulties include the exposure of certain components of the machine which allows particulates and contaminants to interfere with the drive mechanisms. Another difficulty is the complexity of the construction of the prior art devices, which necessitates laborious procedures in order to set up, operate and dismantle a machine. The complexity of the prior art devices not only creates time-consuming procedures; the prior art lathes are also unwieldy in size, often making it difficult to perform machining and repair operations in relatively tight spaces. Further, the prior art devices are often constructed so that the replacement or repair of a relatively small part necessitates replacement or overhaul of a major or significant portion of the device.

A machining lathe which addresses at least some of the above problems is U.S. Pat. No. 4,739,685 issued Apr. 26, 1988, to the owner of the present invention.

SUMMARY OF THE INVENTION

The present invention solves these and many other problems associated with currently available pipe lathes.

SUMMARY OF THE INVENTION

The present invention comprises a portable machining lathe for machining a pipe or similar work piece. The lathe includes a stationary member having two generally semi-circular sections which are cooperatively connected. The stationary member is secured to the work piece by suitable means, preferably by a plurality of locator rods on the inner surface of the stationary member. Mounted upon the stationary member is a gear member having two generally semi-circular sections interconnected to each other. A circular race member connected to the gear member rotates in a circular path against a plurality of roller bearings. In the preferred embodiment, the race section and the bearings have a mating V-shaped profile for engagement with each other. The present invention also includes a tool module. The tool module mounted upon the gear member which contains a tool bit comprises a tool block and a tool block slide which are slidably interconnected for longitudinal movement of the tool module along the pipe or other work piece. In the preferred embodiment, the tool slide has a spring-loaded roller which moves along the pipe to control radial movement of the tool bit.

A particular advantage of the present invention is that the lathe of the present invention is relatively portable in size. Because of the reduced size, the lathe has a reduced weight and is easier to handle by maintenance personnel. In addition, the lathe allows for increased accessibility in tight spaces having relatively low clearance.

Another advantage of the present invention is that the machining lathe enables the weld between two adjoining pipes to be accurately tested so as to verify the absence of defects in the weld. It is a common procedure for pipe junctures in nuclear power plants to be x-rayed in order to determine if there are any defects in the weld. The lathe of the present invention may be utilized to machine off the crown or cap of a weld at the point where the two pipes are interconnected, thus forming a smooth juncture between the pipes which is flush with the outer diameter of the pipes. If the weld crown is not removed, certain ripples in the weld act to hide potentially dangerous hairline cracks in the weld. Thus, the lathe of the present invention eliminates these ripples and allows the inspection of the pipeline welds to be more accurate, thereby verifying reliable pipeline junctures.

Another feature of the present invention is that the pipe lathe is capable of being affixed to the pipe or work piece in a relatively simple manner, and the operation of the lathe requires a minimal amount of time. The lathe is secured to the pipe by means of a plurality of adjustable locators. The tool module of the present invention automatically adjusts the movement of the tool bit in the radial direction to allow for a pipe which is not perfectly round. In addition, the tool bit automatically moves along the width of the weld in the longitudinal direction of the pipe, so as to minimize the amount of manual control required from the operator.

For a better understanding of the invention, and of the advantages obtained by its use, reference should be made to the drawings and the accompanying descriptive manner, in which there is illustrated and described a preferred embodiment of the invention.

BRIEF DESCRIPTION OF THE DRAWINGS

In the Drawings, which form a part of the instant specification in order to be read therewith, an optimum embodiment of the invention is shown, and, in the various views, like numerals are employed to indicate like parts:

FIG. 1 is a perspective view of the machining lathe embodying the present invention;

FIG. 2 is a cross-sectional view of the lathe of FIG. 1 taken generally, along lines 2—2;

FIG. 3 is a cross-sectional view of the lathe, taken generally along lines 3—3 of FIG. 1;

DETAILED DESCRIPTION OF THE PREFERRED EMBODIMENT

Figure 4:
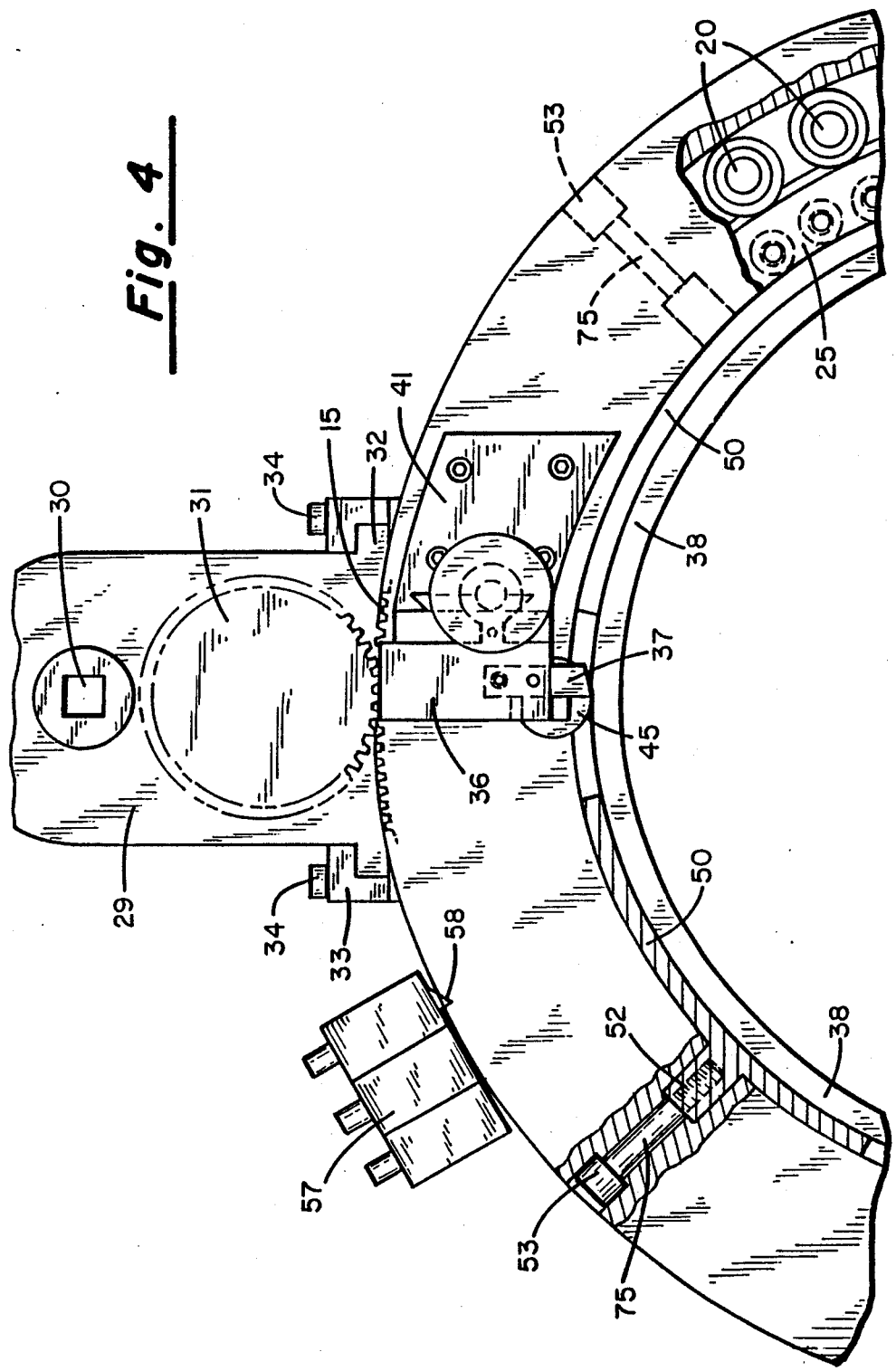
FIG. 4 is a side elevational view of a portion of the lathe.

Referring to the Drawings, there is generally illustrated at 10 a split frame clamshell type of portable machining lathe. The lathe 10 includes a stationary ring member 11 having a first generally semi-circular section 11a and a second generally semi-circular section 11b cooperatively connected to form the stationary ring member 11 by means well known in the art. In the preferred embodiment, the stationary ring member 11 is made of aluminum. The stationary has a top surface 21 and an orthogonal outer surface 76. The two halves of the clamshell 11a and 11b are interconnected by suitable fasteners, e.g., ring in the stationary member 11. Two screws or angle pins 12 are positioned at a tangential angle to extend through threaded holes formed in both halves of the clamshell. A ring gear member 15 is contained within a housing or cover 16. The gear member 15 preferably comprises two semi-circular gear sections cooperatively connected by suitable means. The gear member 15 has a gear teeth 18 (FIG. 5) that extend completely around the outer periphery of the ring gear member 15. When assembled, the two semi-circular gear member 15 form a continuous circular ring gear. The housing 16 is also formed of two semi-circular sections 16a and 16b which abut against the stationary member sections 11a, 11b in a parallel relationship. The housing sections 16a, 16b are interconnected by suitable fastening means, such as two pin and hook fasteners 17 which are preferably 180° from each other spanning the parting line. The gear member 15 is preferably made of a steel material and in one particular preferred embodiment, the gear member 15 has an outside diameter of about sixteen inches. The housing members 16a, 16b are secured around the two gear sections by means of screws or other suitable fastening means.

Figure 5:
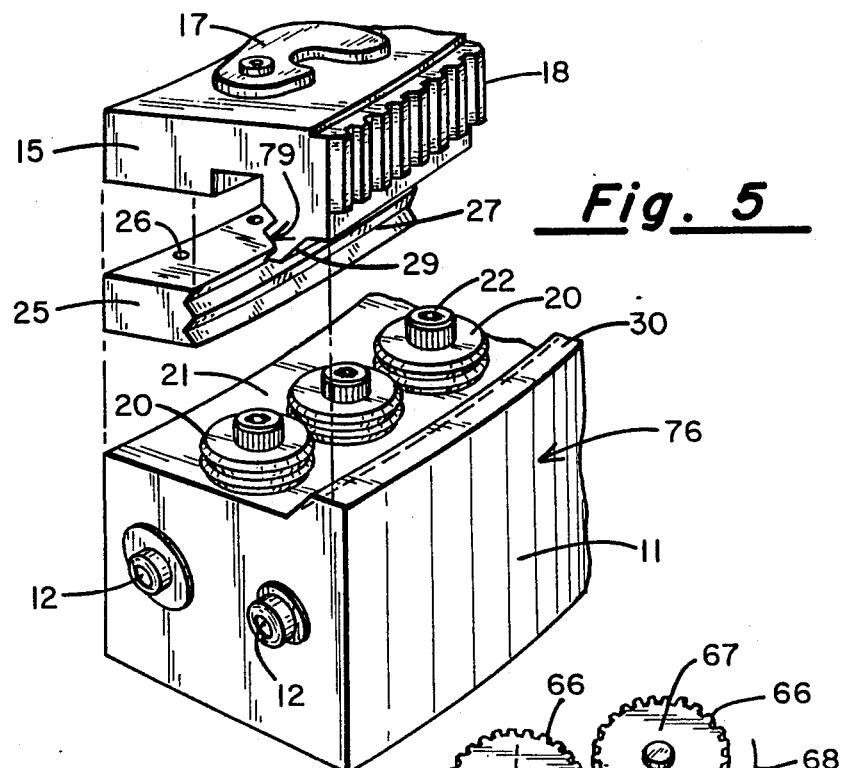
FIG. 5 is an exploded perspective view of a portion of the lathe.

Referring to FIG. 5, a plurality of roller bearings 20 are rotatably mounted on top the surface 21 of the stationary member 11 by means of bolts 22 which serve as axles. Roller bearings 20 span the entire outer periphery of both stationary members 11a, 11b so as to form a complete circle. With reference to FIGS. 2 and 5, the bearings 20 have a central, V-shaped groove 24 which extends around the circumference of the bearings 20. The outer surface of the bearings 20 thus has a general W-shaped surface.

A circular race member 25 is formed from two semi-circular race sections which are cooperatively connected to the two semi-circular gear sections 15. The race 25 is releasably and cooperatively connected to the gear section 15 by a plurality of bolts 26 (FIG. 3). The gear member 15 has an inner cavity 19 in which the bearings 20 are positioned. In the preferred embodiment, the race 25 defines the inner edge of the cavity 19, and the outer edge 27 of the race 25 has a notched configuration corresponding to and mating with the shape of the bearings 20. Thus, as the race 25 relative to the stationary member 11 rotates, the outer sidewall 27 bears against the roller bearings 20. The outer edge 79 of the cavity 19 may have either a notched or straight configuration.

With this design, the lathe is relatively narrow, approximately 3 inches in width. This enables the lathe 10 to be utilized in areas having minimal clearance.

Figure 7:
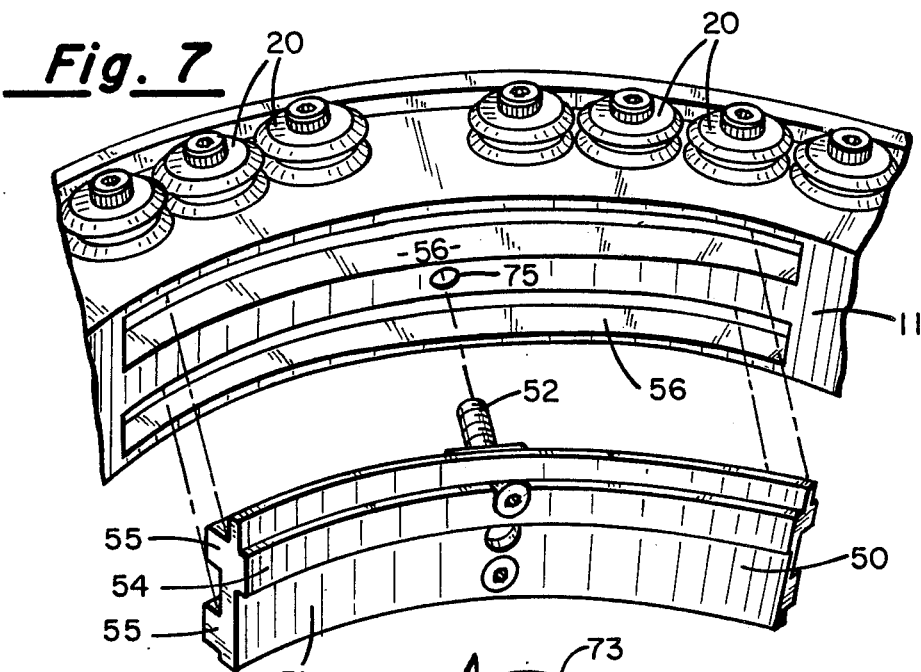
FIG. 7 is an exploded perspective view of the stationary member and locator rods of the present invention.

As illustrated in FIG. 2, a shim 23, in the general shape of a washer, may be placed between the bearing 20 and the top surface 21 of the stationary member 11 to adjust the clearance between the bearing 20 and the race member 25. In the preferred embodiment, all of the bearings 20 have at least one washer which is preferably 0.030 inch in thickness. Some of the bearings 20 have more than one washer for adjustment purposes After a period of use, the position of the bearings 20 can be easily changed by adding additional shims 23 for adjustment purposes to accommodate for wear. With reference to FIG. 7, every other bearing 20 is raised a relatively greater distance than the intervening bearings 20. In this configuration, the raised bearings abut the top of the race groove, whereas the lower bearings 20 move along the bottom of the race groove, thereby allowing for increased stability.

The lathe 10 also includes suitable drive means, such as a motor 28 (FIG. 1). The motor 28 may be one of any number of motors which are suitable for this purpose. Such motors would include air motors and hydraulic motors which are well-known in the art. The motor 28 may also be a straight back, reversible, or right angled motor, as is well-known in the art. In the embodiment shown, the motor 28 is a right angle pneumatic motor. At one end of the motor is a conventional right-angle gear box 29. The gear box 29 has an input shaft 30 interconnected to the motor 28 and an output drive pinion 31 (FIG. 4) which, when the gear box is in place, engages the gear teeth 18 of the gear member 15.

One end of the gear box 29 has a pair of flanges 32. A suitable bracket 33 mounted upon the lathe 10 is provided to receive the flanges 32 for mounting purposes. As illustrated in FIG. 1, the gear box 29 and motor 28 can be mounted to the lathe 10 in a variety of positions according to the particular operating conditions and space constraints. The bracket or clamps 33 have a plurality of suitable fasteners 34, such as bolts, which tighten the clamps 33 against the flanges 32 to provide a secure attachment of the gear box 29 to the lathe 10. The bracket 33 is mounted onto the stationary member 11 by suitable means. Areas for accepting the bracket 33 are located at various points around the periphery of the stationary member 11.

Figure 8:
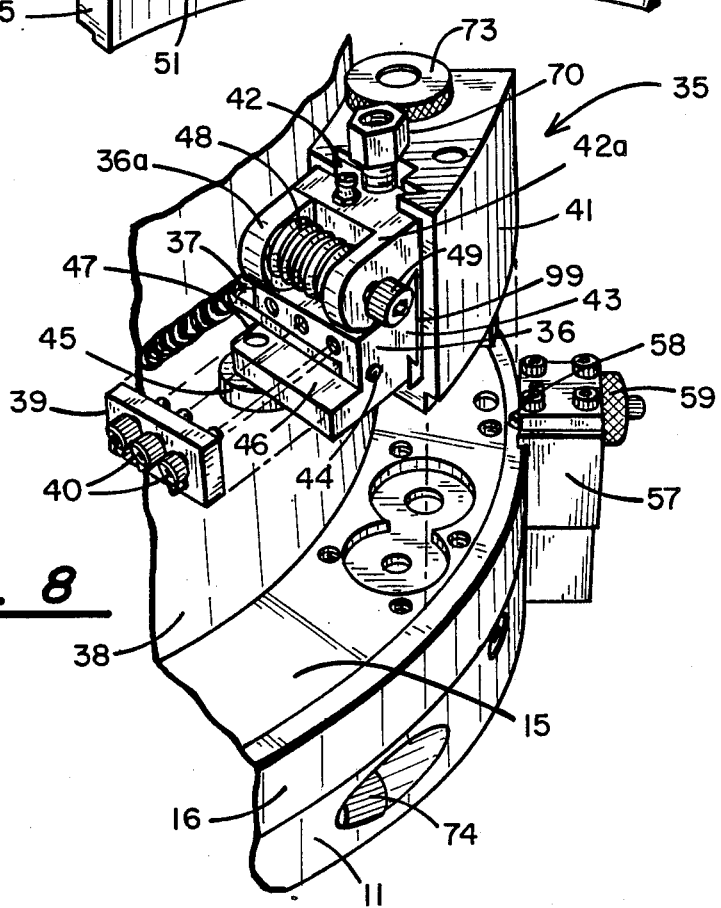
FIG. 8 is an exploded perspective view of the tool mount module and advance mechanism utilized with the lathe of the present invention.

A perspective view of a tool module, generally designated at 35, is shown in FIG. 8. The tool module 35 includes a tool block slide 36 having a slot in which the tool bit 37 is located. The tool bit 37 is removably mounted within the tool block slide 36 by means of a clamping plate 39 having a plurality of suitable fasteners 40. The depth of tool bit 37 is preferably positioned by means of a set screw 44 which can be manually adjusted so as to achieve the proper degree of cut in the pipe 38. The tool bit 37 is of the type well-known in the art and is preferably made of carbide.

Figure 6:
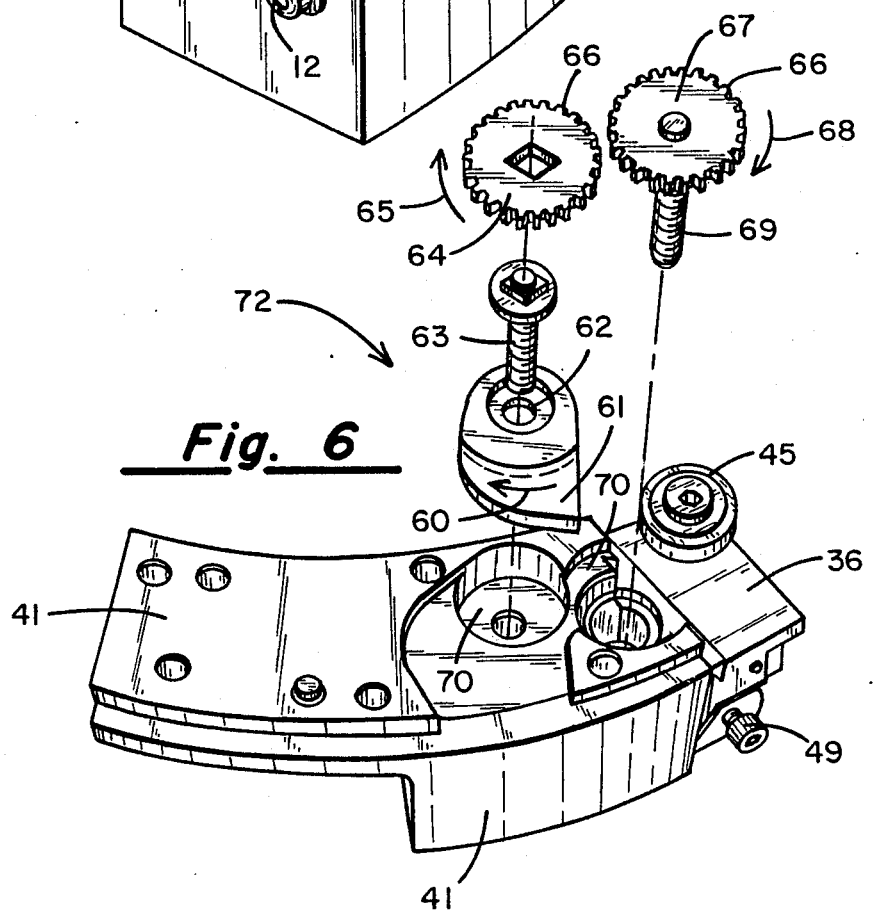
FIG. 6 is an exploded perspective view of the underside of the advance mechanism utilized with the lathe.

With continued reference to FIG. 8, the tool block or autofeed housing 41 is fastened to the gear member 15 by means of suitable fasteners such as screws. The mounting holes in the gear member which receive these fasteners are typically midway between the ends of the two gear sections 15. The tool block slide 36 is mounted upon the tool block 41 by means of a feed screw 69 (FIG. 6). On one end of the feed screw 69 is a nut 70

(FIG. 8) which can be used for manual adjustment of the tool slide 36.

Formed in one edge of the tool block 41 is a dovetail groove which extends in the axial direction with respect to the pipe 38. Fitted into the dovetail groove is a tool block slide 36 having a mating male dovetail segment 42 integrally formed therewith. A further dovetail-shaped groove 99, extending in the generally radial direction as viewed in FIG. 8, is formed in the tool block slide 36. The tool block slide 36 moves in the axial direction with respect to the work piece 38. The tool 37 is capable of movement in the radial direction against the force exerted by the compression spring 48 acting between an ear 36a formed integrally with tool slide block 36 and an ear 42a formed integrally with dovetail flange 42.

Interconnected with the spring-loaded tool block slide 36 proximate the inside of the gear member 15 is a roller or track wheel 45 which is fastened to a flange 46 on the tool slide by means of a bolt 47. The track wheel 45 abuts the outside surface of the pipe 38 so as to follow the pipe's contour as the tool block assembly 35 rotates around the pipe as the ring gear 15 is driven by the motor 28. In this manner, the machining occurs in the desired manner even if the pipe 38 is not precisely round in configuration. The spring 48 provides the force to press the tool 37 against the work piece and to adjust the position and tension of the track wheel 45, and the tool block spring 48 is adjustable by means of a knob 49.

The lathe 10 (FIG. 1) is cooperatively connected to the work piece or pipe 38 by means of a plurality of locator members 50 in the preferred embodiment. The locator member 50 are positioned proximate the inner surface of the stationary member 11 as better illustrated in FIG. 7. The locators 50 have a curved engaging surface 51 that contacts the work piece 38 and corresponds with the degree of curvature of the stationary member 11. The locator 50 on the surface opposite the engaging surface 51 has a pair of integral extension portions 55 which fit within corresponding grooves 56 in the main housing 11 for additional stability and registration rods 50. The locators 50 are supported through the stationary member 11 by means of an internally threaded shaft 52 and locking screw 75 which is connected at the opposite end to an adjusting knob 53. Rotation of the adjusting knob 53 causes the locking screw 75 and the shaft 52 to rotate and advances the locator 50 inwardly toward the pipe or work piece 38. In the preferred embodiment, there are a plurality of locators 50 on the lathe 10. Preferably, the engaging surface 51 of the locating rods 50 has an angular raised bond 54 which is positioned within a circumferential groove 77 (Figure 3) of corresponding size around the pipe 38.

As shown in FIG. 4, the locators additional stability and registration of rods 50. As shown in FIG. 4, the locators 50 are supported through the stationary member 11 by means of an internally threaded shaft 52 and locking screw 75 which is connected at the opposite end to an adjusting knob 53. Rotation of the adjusting knob 53 causes the locking screw 75 and the shaft 52 to rotate and advances the locator 50 inwardly toward the pipe or work piece 38. In the preferred embodiment, there are a plurality of locators 50 on the lathe 10. Preferably, the engaging surface 51 of the locating rods 50 has an annular raised band 54 which is positioned within a circumferential groove 77 (FIG. 3) of corresponding size around the pipe 38.

In operation, the lathe 10 is brought to the job site in a disassembled configuration. In this configuration, the two gear sections 15 are in position over the stationary sections 11a, 11b respectively. The two sections 11a, 11b are then assembled around the work piece 38 and are brought together and assembled by means of the hook and pin fasteners 17. Once the lathe 10 is in place, it can be accurately aligned and held in position by advancing the locators 50 toward the work piece 38. A dial indicator may be used to accurately measure the distance from the center line of the work piece.

The motor 28 and gear box 29 are mounted onto the mounting bracket 33. The mounting bracket 33 is positioned along the lathe 10 so as to provide sufficient clearance for the motor 28. Upon activation of the motor 28, the drive pinion 31 rotates and meshes with the gear member 15, thereby causing rotation of the gear member 15. If it becomes necessary to replace a motor 28 during the machining of a work piece 38, it is only necessary that the screws 34 be loosened and a substitute motor 28 and bracket 33 be replaced.

The rotation of the gear member 15 causes the rotation of the race member 25 which is cooperatively connected to the gear member 15. The bearings 20 guide the race member 25 around its circular path. In this manner, the gear member 15 is free to rotate around and on the stationary member 11. The tool module 35 is mounted upon the gear member 15 and the tool bit 37 is secured in position upon the tool module 35 in order to machine the work piece 38. As the split gear member 15 rotates, the tool block 35 is carried with the gear member 15.

Means are also provided for automatically advancing the tool bit 37 in the longitudinal direction of the work piece 38. The advance mechanism 72 in FIG. 6 allows the complete width of the weld or groove to be machined without manual adjustment from the operator. Mounted upon the stationary member 11 is a tripper housing 57. The tripper housing 57 includes a trip stop 58, which is best viewed in FIG. 8. The trip stop 58 is positioned proximate the outer periphery of the lathe 10, proximate the outer edge of the gear member 15. In the preferred embodiment, a screw (not shown) in the housing 57, which is rotatable by means of a knob 59, enables the trip stop 58 to be withdrawn into the housing 57. This procedure may be utilized as a safety mechanism when it is desired that no longitudinal movement of the tool module 35 occur.

Upon each complete revolution of the tool module 35, a cam extension member 159 (FIG. 6) moves in the direction indicated by the arrow 60 when it passes over the stationary trip stop 58. The cam extension member 59 has a lever edge 61 which extends outwardly so as to engage with the trip stop 58 in its orbital travel. On the other end of the cam member 59 is a received aperture 62. Insertable within the aperture 62 is a bolt 63 which is cooperatively connected to and causes rotation of a first ratchet or drive gear 64 as illustrated by the arrow 65.

The teeth 66 of the drive gear 64 mesh with the teeth 66 of a second ratchet or feed gear 67, thereby causing rotation of the feed gear 67 as illustrated by the arrow 68. As illustrated by FIG. 6, the upper surface of the gear member 15 has two circular apertures 70 to accommodate the two gears 66, 67. The gears 66, 67 have a one-way clutch which allows rotation in only one direction as illustrated by the arrows 65, 68. The feed gear 67 is interconnected to the feed screw 69. Rotation of the feed screw 69 causes movement of the dovetail flange 42 with respect to the tool block 41, thereby moving the tool bit 37 an incremental amount. In one particular preferred embodiment, the feed screw 69 has approximately 30 teeth per inch and a total travel of approximately three-fourths of an inch.

There is also provided a means for disengaging the advance mechanism 72. The advance mechanism 72 is in an engaged position when the gears 64, 67 are aligned with each other so that the gear teeth 66 of the ratchets 64, 67 mesh. The advance mechanism 72 can be placed in a non-engaged, upper position by raising the feed disengagement knob 73 (FIG. 8) so as to lift the feed gear 67 out of engagement with the drive gear 64. In the disengaged position, the tool bit 37 does not move in an axial direction relative to the work piece 38.

Even though numerous characteristics and advantages of the invention have been set forth in the foregoing description, together with details of the structure and function of the invention, the disclosure is illustrative only, and changes can be made in detail, especially in areas of shape, size, and arrangement of parts, within the principles of the invention, to the full extent indicated by the broad, general meaning of the appended claims.

What is claimed is:

1. A portable machining lathe for machining a pipe or other work piece, comprising:
    (a) a stationary member having a first and second generally semi-circular sections cooperatively connected, said stationary member having a top surface and an outer surface;
    (b) locator means for securing said stationary member to the work piece;
    (c) a gear member having first and second generally semi-circular sections cooperatively connected;
    (d) a plurality of bearings cooperatively connected to said top surface of said stationary member said plurality of bearings forming a single set of bearings defining a circular path;
    (e) a circular race member having first and second semi-circular race sections cooperatively connected to said gear member, said race having a groove, said groove having a top and a bottom whereby said race member rotates upon said set of bearings in a circular path; and
    (f) said plurality of bearings having at least a first bearing and a second bearing, a first shim positioned between said first bearing and said top surface of said stationary member and a second shim positioned between said second bearing and said top surface of said stationary member, said second shim raising said second bearing relative to said first bearing, wherein said first bearing abuts said bottom of said race groove and said second bearing abuts said top of said race groove.

2. The portable machining lathe of claim 1, further comprising means for driving said gear member.

3. The portable machining lathe of claim 1, wherein said race sections each have an inner side wall and an outer side wall, said outer side wall having a generally V-shaped profile; and said bearings having a mating V-shaped profile for engagement of said race sections as said race sections rotate on said circular path.

4. The portable machining lathe of claim 3, wherein at least one shim is positioned between each of said bearings and said top surface of said stationary member, whereby the location of said bearings may be adjusted with respect to said inner surface for stability and wear purposes.

5. The portable machining lathe of claim 4, further comprising a tool module including:
    (a) a tool block cooperatively connected to said gear member, said tool block defining a slot;
    (b) a tool block slide adapted to be slid in said slot, said tool block slide having an opening for receiving a tool bit; and
    (c) means for effecting longitudinal movement of said tool block and also means for cooperatively connecting said tool block slide to said tool block, said connecting means comprising a feed screw.

6. The portable machining lathe of claim 5, further comprising a roller interconnected to said tool block slide which moves along the work piece as said gear member is rotated, said roller being interconnected to a spring, wherein the position of said roller controls the radial position of said tool bit.

7. The portable machining lathe of claim 5, further comprising:
    (a) a cam member cooperatively connected to said tool block and operatively connected to said feed screw; and
    (b) a stationary trip stop cooperatively connected to said stationary member at a point along its outer periphery, wherein abutment of said cam against said trip stop causes movement of said feed screw and longitudinal movement of said tool bit along the work piece.

* * * * *